US012625021B1

(12) United States Patent
Cillessen et al.

(10) Patent No.: US 12,625,021 B1
(45) Date of Patent: May 12, 2026

(54) SYSTEMS AND METHODS FOR RAPID FORCE-BASED MEASUREMENTS OF RESIDUAL STRESS

(71) Applicant: National Technology & Engineering Solutions of Sandia, LLC, Albuquerque, NM (US)

(72) Inventors: Dale Cillessen, Sandia Park, NM (US); Kyle Leslie Johnson, Starkville, MS (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 294 days.

(21) Appl. No.: 18/643,033

(22) Filed: Apr. 23, 2024

Related U.S. Application Data

(60) Provisional application No. 63/567,961, filed on Mar. 21, 2024.

(51) Int. Cl.
*G01L 5/00* (2006.01)
*B33Y 40/00* (2020.01)

(52) U.S. Cl.
CPC ............ *G01L 5/0047* (2013.01); *B33Y 40/00* (2014.12)

(58) Field of Classification Search
CPC . G01L 5/0047; G01L 1/00; G01L 1/22; G01L 5/00; G01L 1/241; G01L 19/147; B33Y 40/00

USPC ................ 324/209, 238, 240; 257/415, 417; 73/849
See application file for complete search history.

(56) References Cited

U.S. PATENT DOCUMENTS 11,002,649 B1 * 5/2021 Boyce ...................... G01N 3/04

FOREIGN PATENT DOCUMENTS

CN      112763318 A   *   5/2021  ............... G01N 3/08
CN      113758620 A   *   12/2021  ........... G01L 5/0047

* cited by examiner

*Primary Examiner* — Daniel S Larkin
*Assistant Examiner* — Anthony W Megna Fuentes
(74) *Attorney, Agent, or Firm* — Merle W. Richman

(57) ABSTRACT

Systems and methods that directly measures forces caused by residual stresses in components. The components may be manufactured components including via Additive Manufacturing (AM). The system and method may use a small force sensor fitted onto a part of the component and a force sensor may be placed/fitted near a region of expected residual stress of the component. The tension device may be tensioned to apply a small preload onto the component while a relaxation technique is applied to regions of the component while measuring the load on the force sensor. Regions may be individually and sequentially relaxed by slitting the regions via wire electrical discharge machining (EDM) while measuring the load on the force sensor to directly measure force caused by residual stress within the component.

18 Claims, 5 Drawing Sheets

AREA AA

22

32

30

20

18

12

10

40

42

44

44

13

100

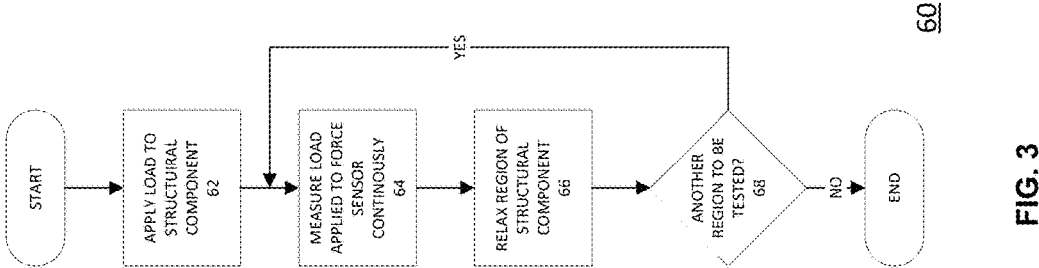
START
APPLY LOAD TO STRUCTURAL COMPONENT 62
MEASURE LOAD APPLIED TO FORCE SENSOR CONTINOUSLY 64
RELAX REGION OF STRUCTURAL COMPONENT 66
ANOTHER REGION TO BE TESTED? 68
YES
NO
END
60
FIG. 3
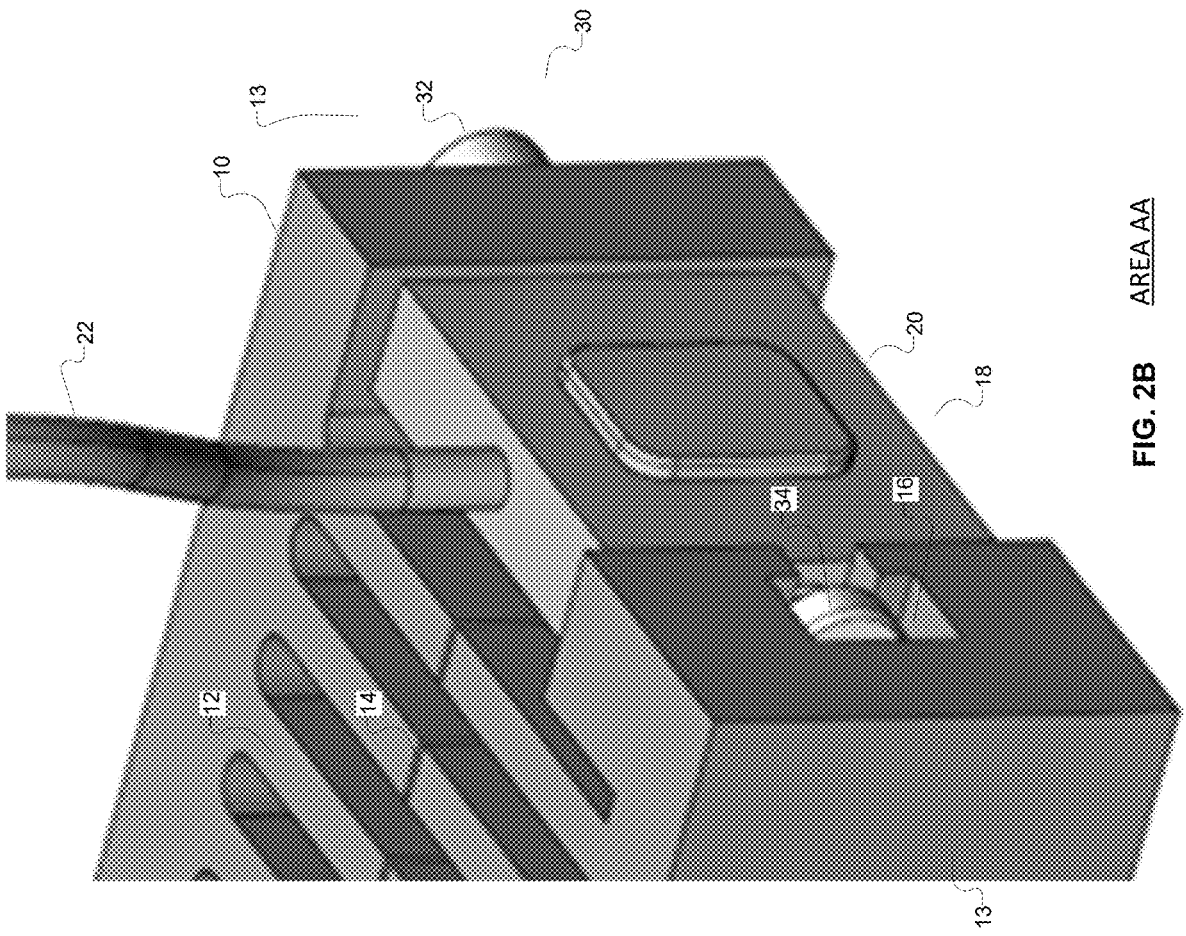
FIG. 2B    AREA AA

4/5

50

SYSTEMS AND METHODS FOR RAPID FORCE-BASED MEASUREMENTS OF RESIDUAL STRESS

CROSS-REFERENCE TO RELATED APPLICATION

This application claims the benefit of U.S. Provisional Application No. 63/567,961, filed Mar. 21, 2024, which is incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

TECHNICAL FIELD

The present invention relates to systems and methods for measuring or determining residual stress in a component.

BACKGROUND

A residual stress field is a self-equilibrating stress field in a body independent of any external forces or tractions. Residual stresses are an elastic response to incompatible local strains within a component, for example, due to non-uniform plastic deformation. These stresses are often the result of manufacturing processes such as forging, rolling, bending, extrusion, machining, and grinding. Residual stresses can also be caused by material phase changes and/or large thermal gradients caused by processes such as welding, quenching, or casting. More recently, residual stresses have received much attention in the field of Additive Manufacturing (AM), which generally describes processes that deposit material in a layer-by-layer fashion. These processes often utilize very localized heat sources, such as lasers, to melt material, which leads to high thermal gradients and high residual stresses.

SUMMARY

The present disclosure is directed to systems and methods for directly measuring forces caused by residual stresses in components. The components may be manufactured components including via Additive Manufacturing (AM). The system and method may use a small force sensor fitted onto a part of the component. The force sensor may be placed/fitted near a region of expected residual stress of the structural component. The force sensor may be connected to the component via a tension device including machine screws. The tension device may be tensioned to apply a small preload onto the component. A relaxation technique may be applied to regions of the component while measuring the load on the force sensor. The relaxation technique may include layer removal, sectioning, hole-drilling, ring coring, and slitting of regions individually. Regions may be individually and sequentially relaxed by slitting the regions via wire electrical discharge machining (EDM) while measuring the load on the force sensor to directly measure force caused by residual stress within the component.

BRIEF DESCRIPTION OF THE DRAWINGS

The drawings illustrate several embodiments of the invention, wherein identical reference numerals refer to identical or similar elements or features in different views or embodiments shown in the drawings. The drawings are not to scale and are intended only to illustrate the elements of various embodiments of the present invention.

FIG. 2B is an enlarged diagram of Area AA of testing architecture shown in FIG. 2A according to various embodiments.

FIG. 3 is an algorithm for measuring residual stress in regions of a structural component according to various embodiments.

DETAILED DESCRIPTION

Residual stresses are independent of external loads and often unknown. They are typically ignored during engineering design and analysis. Sometimes residual stresses can improve performance, such as compressive stresses on the surface of a component from shot peening that can improve fatigue life. Residual stress can also be harmful, such as tensile stresses on the surface of a part put into bending. Residual stresses may also cause distortion during manufacturing that can lead to a part geometry outside of acceptable tolerances. Distortion is a major problem in welding, which can be one of the final steps of manufacturing. The resulting distortion can render a part useless and can lead to increased cost and schedule delays. Distortion is also common when a part is machined because the forces due to stress on the cut surface will be relieved and the forces in the remaining material (due to stress gradients caused by the self-equilibrating nature) will cause the material to move.

Accordingly, it is important to determine residual stress in components manufactured or otherwise. Quantifying residual stress may employ relaxation-based techniques and diffraction-based methods. Relaxation-based techniques release residual stresses (relaxes them) caused by deformations in a component by some form of cutting or material removal. In an embodiment, regions of a component whose residual stress(es) are to be determined may be relaxed by layer removal, sectioning, hole-drilling, ring coring, slitting, and contour techniques. In various embodiments, the component to be tested geometry and type of cut made may correspond to the particular relaxation technique where they each have varying degrees of component damage and amount of residual stress information discoverable.

Figure 1:
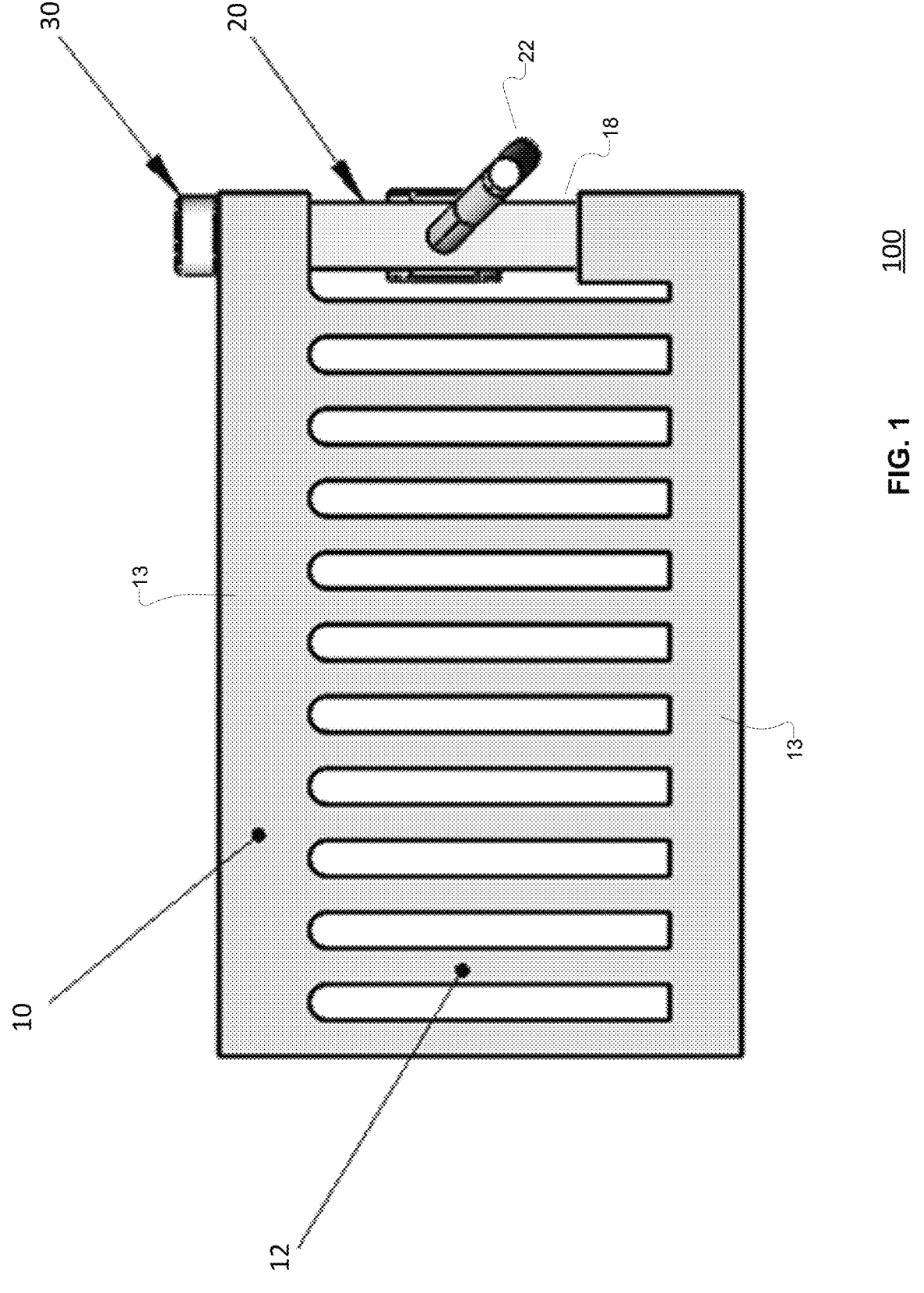
FIG. 1 is a simplified front diagram of testing architecture for determining residual stresses in regions of a structural component according to various embodiments.
Figure 2A:
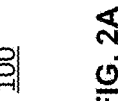
FIG. 2A is a simplified isometric diagram of testing architecture for determining residual stresses in regions of a structural component via a wire Electrical Discharge Machining (EDM) according to various embodiments.
Figure 5:
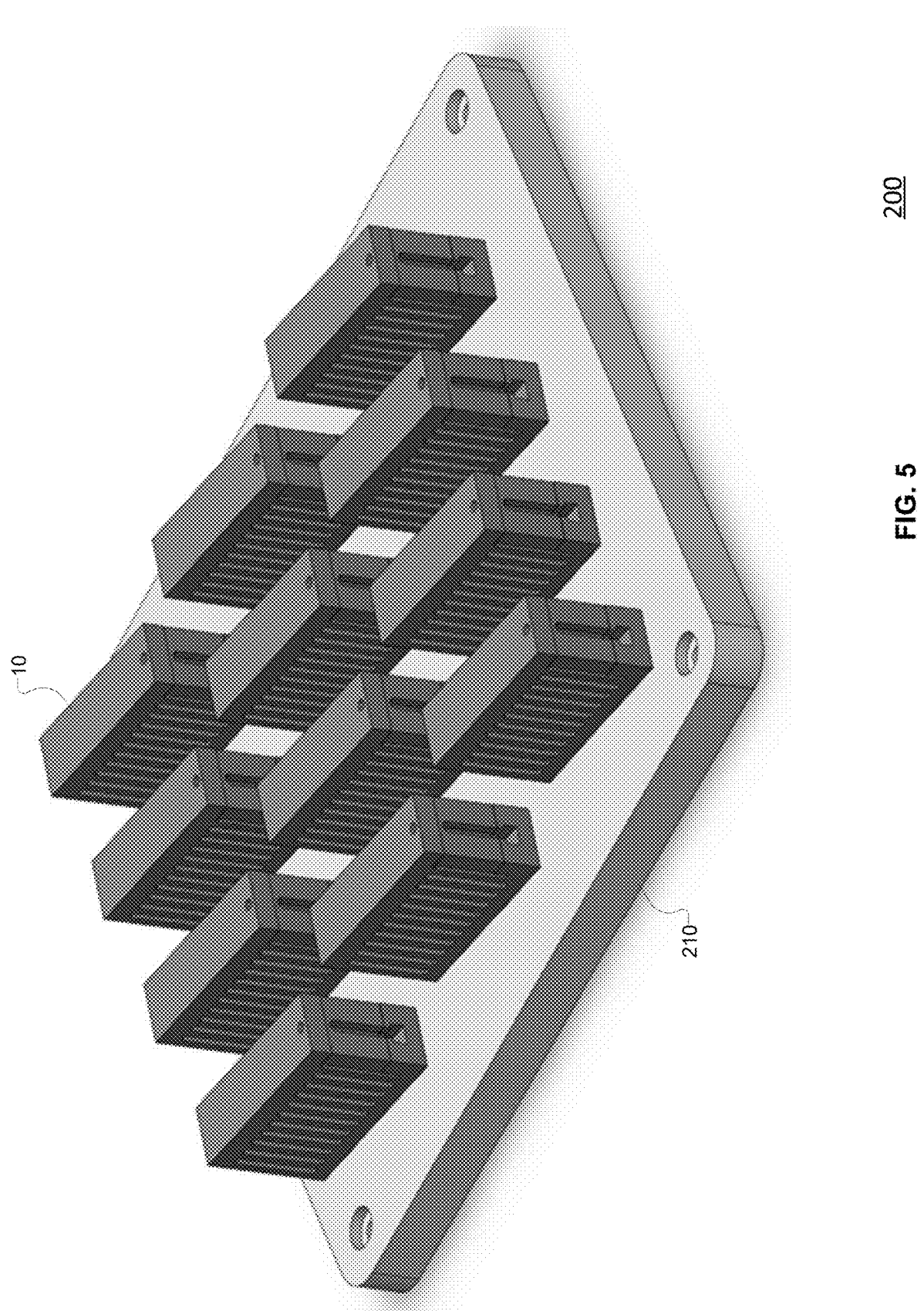
FIG. 5 is an isometric diagram of structural components as manufactured according to various embodiments.

FIG. 1 is a simplified front diagram of testing architecture 100 for determining residual stresses in regions 12 of a structural component 10 according to various embodiments. FIG. 2A is a simplified isometric diagram of testing architecture 100 for determining residual stresses in regions 12 of a structural component 10 via a wire Electrical Discharge Machining (EDM) 40 according to various embodiments. FIG. 2B is an enlarged diagram of Area AA of testing architecture 100 shown in FIG. 2A according to various embodiments. The structural component 10 may be a bridge in an embodiment consisting of an upper and lower rectangular prism 13 connected by a plurality of vertical struts or posts 12. A plurality of these components 10 may be formed on a base 210 in a configuration 200 shown in FIG. 5. In an embodiment, the components 10 may be produced by Laser Powder Bed Fusion (LPBF) Additive Manufacturing (AM). In an embodiment, the structural components 10 may be produced with different process settings with multiple components 10 per manufacturing cycle such as shown in FIG. 5. A layer-by-layer AM process may require sufficient base material 210 for manufacturing of AM based components 10. In an embodiment, structural components 10 may be separated from the base material 210 with use of a saw or wire EDM 40.

In an embodiment during design/production of the component, a mounting slot 18 and tension device support may be included. Such a configuration may facilitate rapid mounting and unmounting of a force sensor 20 and tension device 30, thereby enabling many components 10 to be tested in a high-throughput manner. As shown in FIGS. 1, 2A, and 2B, a force sensor 20 may be placed between prisms 13 into slot 18. A tension device 30 may be coupled between the prisms 13 and through the force sensor 20. In an embodiment, the tension device 30 may include head and shaft 32 mounted above a first prism 13 and a bolt 34 seated into an opening 16 in the other prism 13. The force sensor 20 may include an electrical connector 22 couplable to a computing device including a processor, data acquisition system/interface, and memory for receiving and processing force signals from the force sensor 20.

Figure 4:
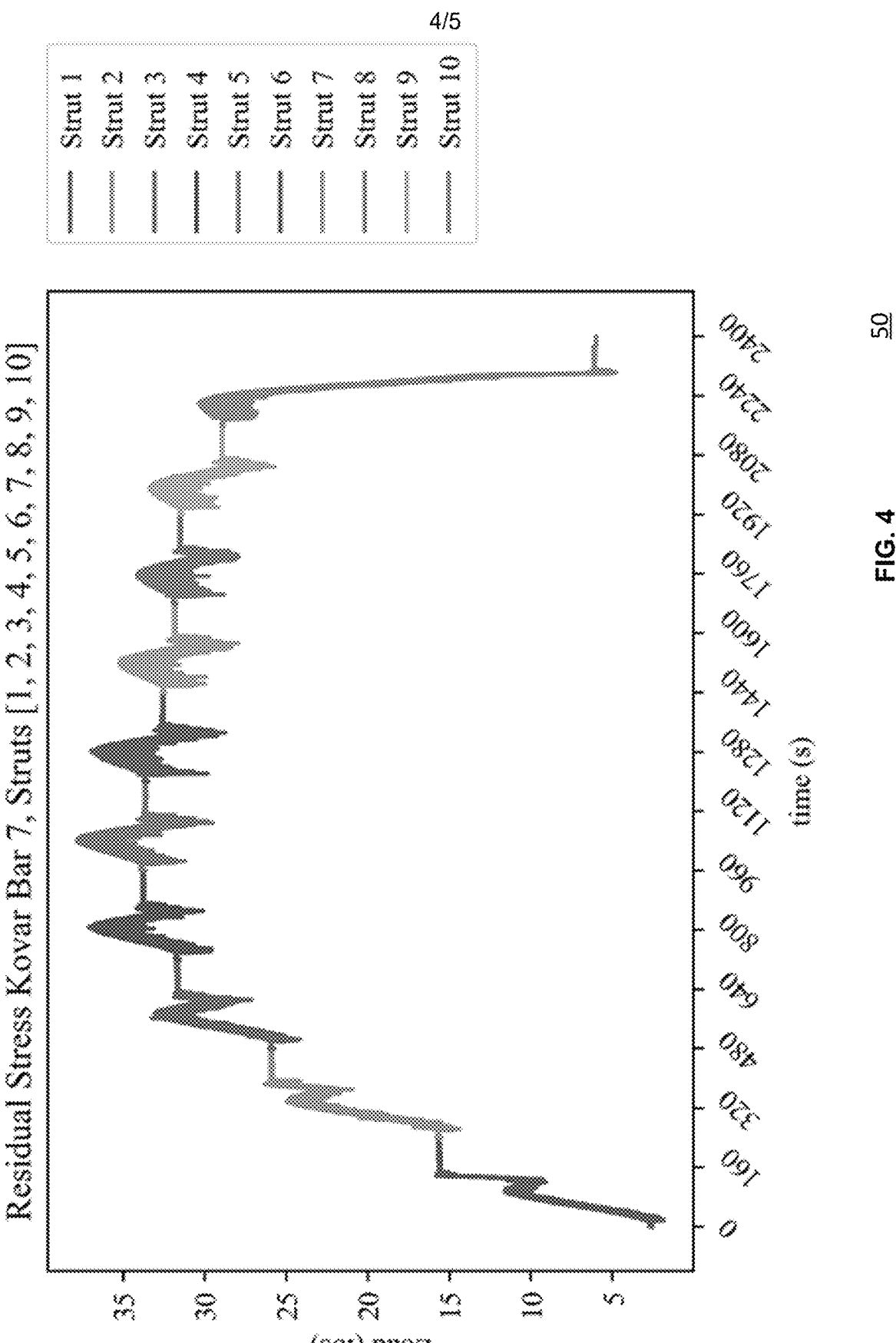
FIG. 4 is a graph of force sensor data across a structural component to measure residual stress in regions as they are relaxed according to various embodiments.

In an embodiment, the testing configuration 100 shown in FIGS. 1, 2A, and 2B and the algorithm 60 show in FIG. 3 may be employed to measure/determine residual stresses in a structural component 10, in particular for each strut 12 for this particular component. During activity 62, a load may be applied to the structural component 10 via the tension device 30. The desired load may be verified by the viewing the output of the force sensor. For example, as shown in FIG. 4, the initial load may be about 2 to 3 lbs. (at time 0). In an embodiment, activity 62 may include mounting the force sensor into the slot 18 and securely same with a desired tension on the structural component 10 via the tension device 30.

Via the force sensor 20 and a coupled computing device, the load applied to the force sensor may be continuously measured during the testing process as shown in FIG. 4 (activity 64). Then a region of the structural component may be relaxed (activity 66). In the embodiment shown in FIGS. 1-2B, a region to be relaxed may be a strut 12 and the strut may be relaxed by cutting a slit therein 14 via a cutting mechanism. In an embodiment, the cutting mechanism may be a wire EDM 40 having electrodes 44 between a wire 42. The cutting rate or velocity of the cutting mechanism may be controlled by a separate controller (such as a wire EDM controller) or by the same computing device that receives the force sensor 20 data. As shown in FIG. 4, as region (strut 12) in the structural component 10 is cut 14, the residual stress contained within the region (strut 12) is released and measured by the force sensor 20 by the resultant change in load. The algorithm 60 may be repeated until all desired regions (struts 12) are tested by relaxation and measurement (activity 68).

In particular in an embodiment, as the wire EDM 40 cuts (relaxes) each region (strut 12), force (from force sensor 20) and timing data may be captured via the computing device. The force may be represented in Load (lbs.) and time (seconds). As noted, FIG. 4 displays the force sensor 20 captured data during the testing process (employment of algorithm 60). As shown in this figure, the force vs. time curves for each region 12 may be nonlinear, which may be due to a complex stress state in the region (struts) 12. It is noted that the testing configuration 10 and algorithm may be scaled to accommodate smaller and larger geometries.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of determining residual stress in a region of a component, including:

applying a preload on the component;

applying a relaxation technique to the region; and measuring a load on the component while applying the relaxation technique to the region;

wherein measuring the load on the component while applying the relaxation technique to the region includes: employing a force sensor in a section of the component where the load on the region of the component is measured; and measuring via the force sensor the load on the component while applying the relaxation technique to the region.

2. The method of determining residual stress of claim 1, wherein applying a preload on the component includes employing a tension device to apply a preload on the component.

3. The method of determining residual stress of claim 2, wherein measuring the load on the component while applying the relaxation technique to the region includes: employing the force sensor together with the tension device in a section of the component where the load on the region of the component is measured; and measuring via the force sensor the load on the component while applying the relaxation technique to the region.

4. The method of determining residual stress of claim 3, wherein the component is manufactured via additive manufacturing to include the section that is sized to receive the force sensor and the tension device, enable the force sensor to measure the load on the region of the component, and enable the tension device to place the load on the component.

5. The method of determining residual stress of claim 1, wherein the component is a structural component.

6. The method of determining residual stress of claim 1, wherein the component is manufactured.

7. The method of determining residual stress of claim 1, wherein the component is manufactured via additive manufacturing.

8. The method of determining residual stress of claim 1, wherein the component is manufactured via additive manufacturing to include the section that is sized to receive the force sensor and enable the force sensor to measure the load on the region of the component.

9. The method of determining residual stress of claim 1, wherein applying the relaxation technique to the region includes slitting the region via wire electrical discharge machining.

10. A method of determining residual stress in a plurality of regions of a component, including:

applying a preload on the component;

sequentially applying a relaxation technique to the plurality of regions; and

measuring a load on the component while sequentially applying a relaxation technique to the plurality of regions;

wherein measuring the load on the component while sequentially applying a relaxation technique to the plurality of regions includes: employing a force sensor in a section of the component where the load on the plurality of regions of the component is measured; and measuring via the force sensor the load on the component while sequentially applying the relaxation technique to the plurality of regions.

11. The method of determining residual stress of claim 10, wherein applying a preload on the component includes employing a tension device to apply a preload on the component.

12. The method of determining residual stress of claim 11, wherein measuring the load on the component while sequentially applying the relaxation technique to the plurality of regions includes: employing the force sensor together with the tension device in a section of the component where the load on the plurality of regions of the component is measured; and measuring via the force sensor the load on the component while sequentially applying the relaxation technique to the plurality of regions.

13. The method of determining residual stress of claim 12, wherein the component is manufactured via additive manufacturing to include the section that is sized to receive the force sensor and the tension device, enable the force sensor to measure the load on the plurality of regions of the component, and enable the tension device to place the load on the component.

14. The method of determining residual stress of claim 10, wherein the component is a structural component.

15. The method of determining residual stress of claim 10, wherein the component is manufactured.

16. The method of determining residual stress of claim 10, wherein the component is manufactured via additive manufacturing.

17. The method of determining residual stress of claim 10, wherein the component is manufactured via additive manufacturing to include the section that is sized to receive the force sensor and enable the force sensor to measure the load on the plurality of regions of the component.

18. The method of determining residual stress of claim 10, wherein sequentially applying the relaxation technique to the plurality of regions includes sequentially slitting the plurality of regions via wire electrical discharge machining.

\* \* \* \* \*